United States Patent [19]
Endo et al.

[11] Patent Number: 4,595,954
[45] Date of Patent: Jun. 17, 1986

[54] IMAGE SIGNAL REPRODUCTION CIRCUIT FOR SOLID-STATE IMAGE SENSOR

[75] Inventors: Yukio Endo; Nozomu Harada; Okio Yoshida, all of Yokohama, Japan

[73] Assignee: Tokyo Shibaura Denki Kabushiki Kaisha, Kawasaki, Japan

[21] Appl. No.: 591,491

[22] Filed: Mar. 20, 1984

[30] Foreign Application Priority Data

Mar. 23, 1983 [JP] Japan .................................. 58-48141

[51] Int. Cl.$^4$ ............................................. H04N 3/14
[52] U.S. Cl. ..................................... 358/213; 358/209
[58] Field of Search ................ 358/213, 212, 209, 160; 357/24 LR; 250/578, 204; 375/26

[56] References Cited

U.S. PATENT DOCUMENTS

| | | | |
|---|---|---|---|
| 3,700,803 | 10/1972 | Rhee | 358/167 |
| 3,944,816 | 3/1976 | Harada | 358/213 |
| 4,009,388 | 2/1977 | Seachman | 250/578 |
| 4,131,919 | 12/1978 | Lloyd et al. | 358/213 |
| 4,145,721 | 3/1979 | Beaudouin et al. | 358/213 |
| 4,167,754 | 9/1979 | Naguma et al. | 358/167 |
| 4,220,977 | 9/1980 | Yamanaka | 358/213 |
| 4,320,413 | 3/1982 | Takemura | 358/44 |
| 4,335,406 | 6/1982 | Ohba et al. | 358/213 |
| 4,413,284 | 11/1983 | Izumita et al. | 358/213 |
| 4,479,143 | 10/1984 | Watanabe et al. | 358/44 |
| 4,499,497 | 2/1985 | Levine | 358/213 |
| 4,535,363 | 8/1985 | Harada et al. | 358/213 |
| 4,543,601 | 9/1985 | Harada et al. | 358/213 |

FOREIGN PATENT DOCUMENTS

| | | |
|---|---|---|
| 2849749 | 5/1980 | Fed. Rep. of Germany . |
| 3049130 | 12/1980 | Fed. Rep. of Germany . |
| 3149567 | 6/1982 | Fed. Rep. of Germany . |
| 53-101939 | 9/1978 | Japan .................................. 358/213 |
| 5829275 | 3/1981 | Japan . |
| 1516764 | 7/1978 | United Kingdom . |

OTHER PUBLICATIONS

SID'81 Digest (23.1) 288–289, Image–Shift Resolution Enhancement Techniques for CCD Imagers; K. A. Hoagland; 1982.

*Primary Examiner*—Gene Z. Rubinson
*Assistant Examiner*—Stephen Brinich
*Attorney, Agent, or Firm*—Oblon, Fisher, Spivak, McClelland & Maier

[57] ABSTRACT

In an image sensing system, a solid-state image sensor is mounted on a vibration stand in a manner as to vibrate horizontally to an incoming light in synchronization with one frame period, thereby sensing while alternatively displacing at different sampling positions in two field periods. Field image signals from the image sensor is supplied, through a signal processor, to a signal reproduction unit which includes a carrier generator for producing first and second carrier signals having the same frequency as the horizontal readout frequency of the image sensor and a phase in reverse to one other in the field periods, and an AM modulator for amplitude-modulating the carrier signal. The amplitude modulation field signals thus obtained are sliced at a suitable level by a slicer and then synthesized each other to obtain a frame image signal.

12 Claims, 26 Drawing Figures

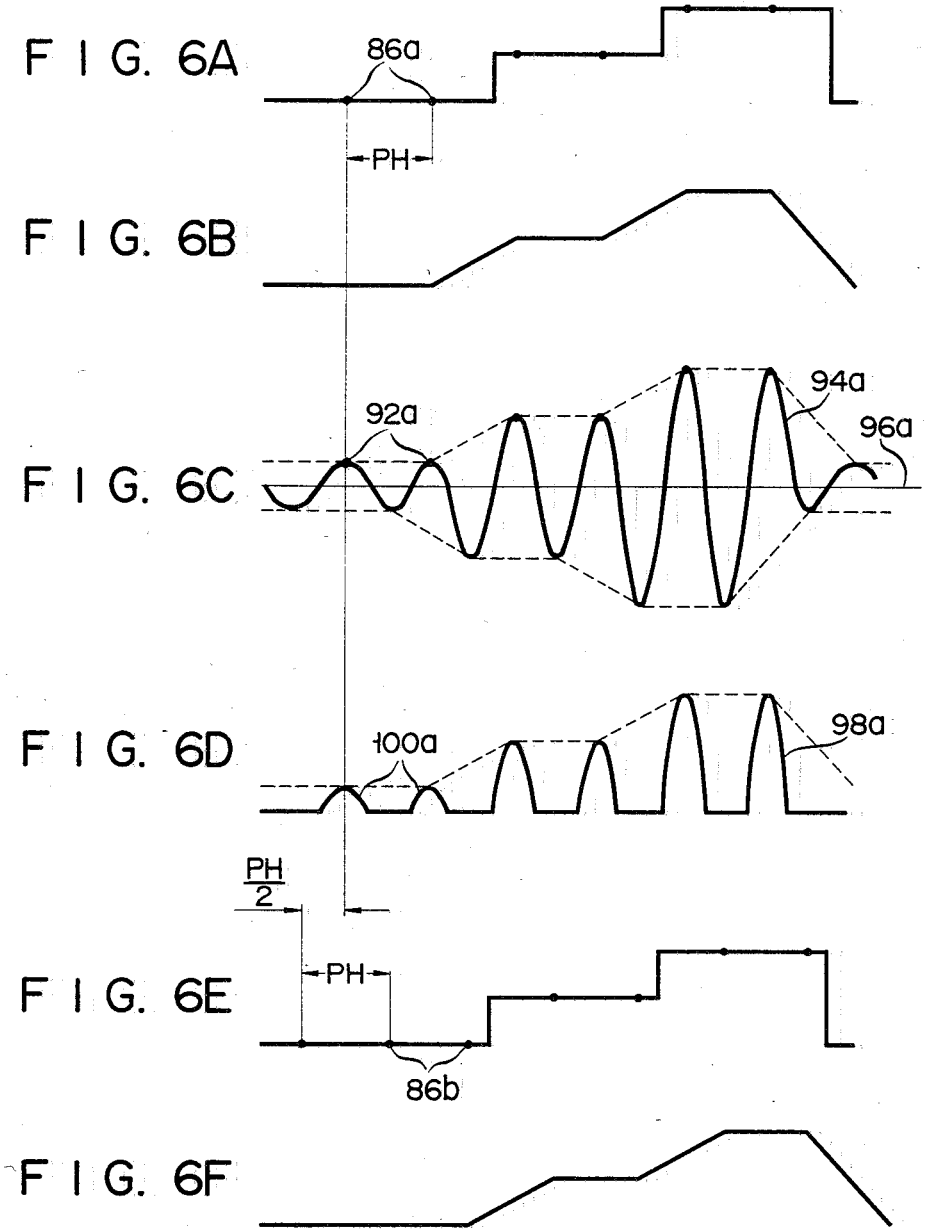

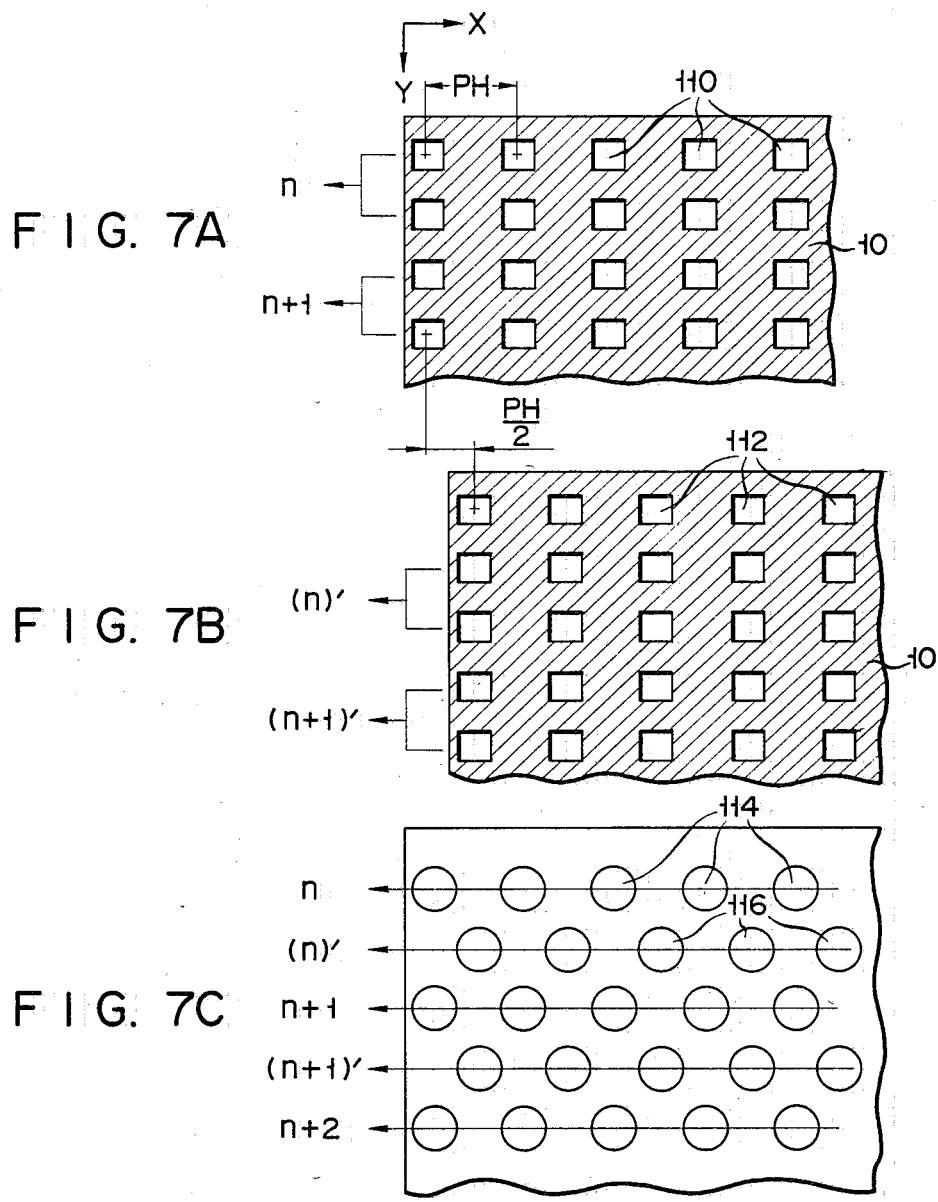

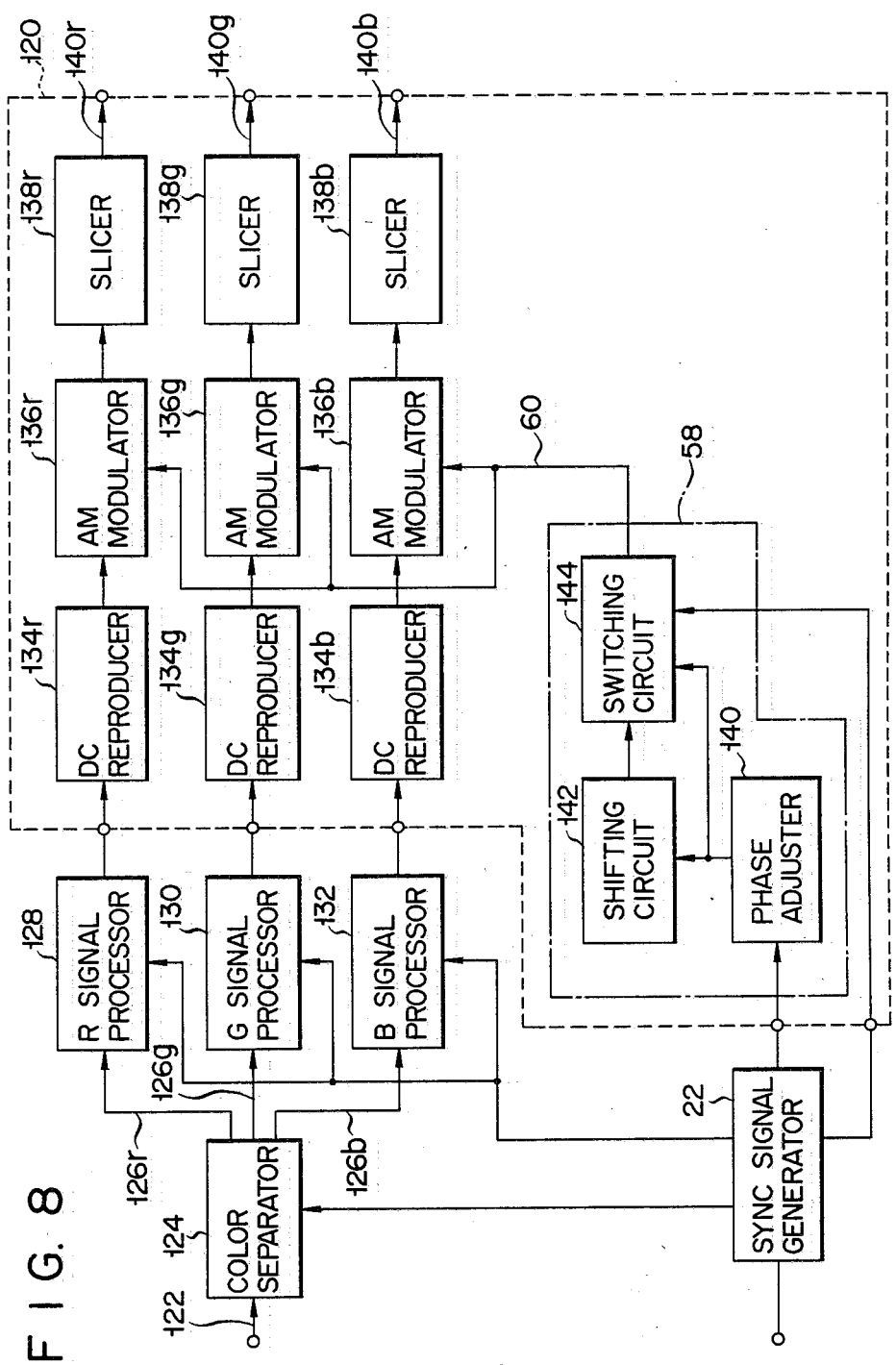
F I G. 8

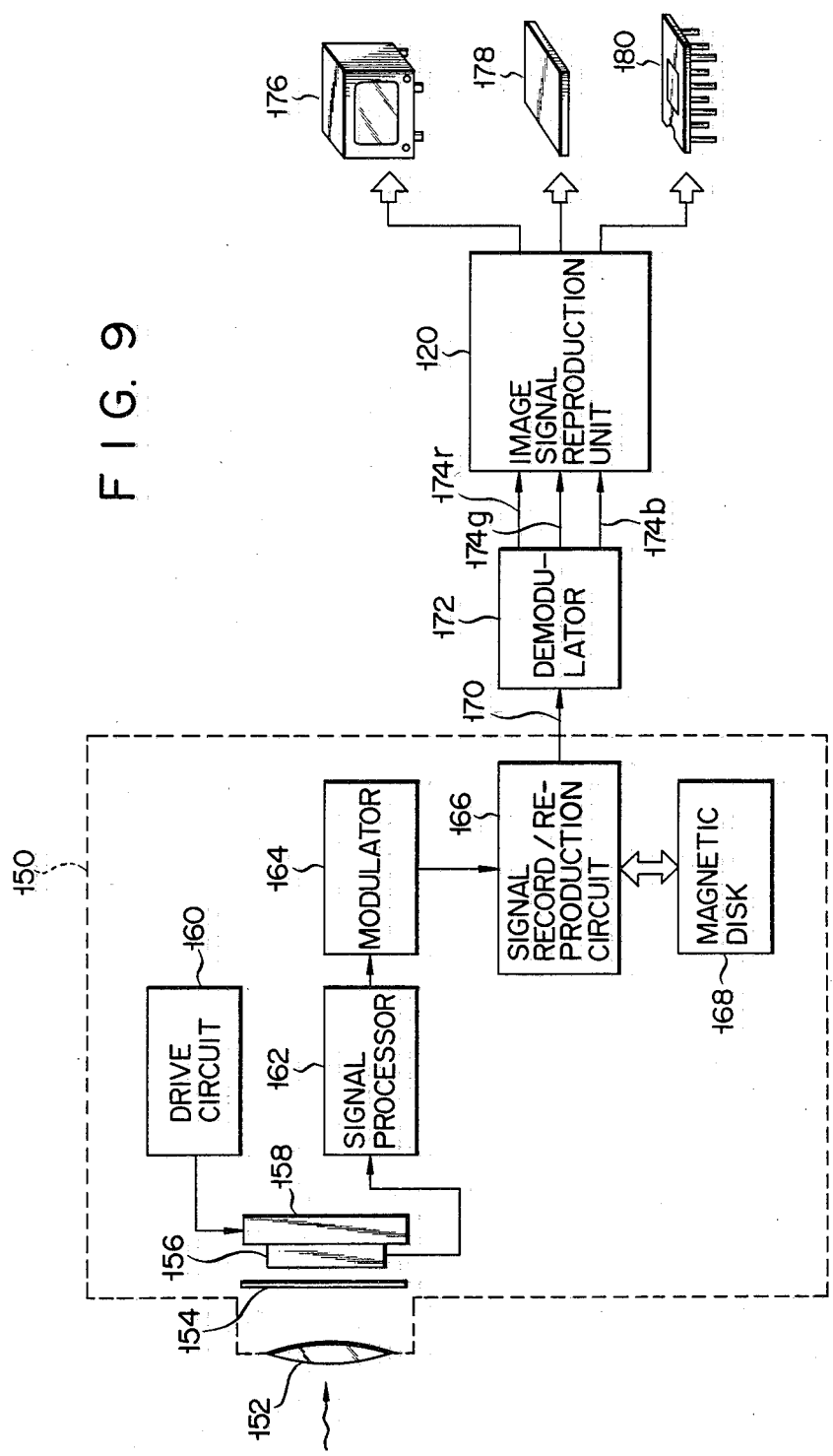

IMAGE SIGNAL REPRODUCTION CIRCUIT FOR SOLID-STATE IMAGE SENSOR

BACKGROUND OF THE INVENTION

The present invention relates in general to an image signal reproduction circuit for a solid-state image sensor and, more particularly, to a reproduction circuit device for reproducing an output image signal produced by a solid-state image sensor, which senses an image while swinging relative to an incoming image light.

U.S. patent application Ser. No. 451,465 (Nozomu HARADA et al) discloses a technique for producing an image of high resolution, the degree exceeding the actual number of picture elements, by employing a solid-state image sensor having a limited number of picture elements. Typically, a solid-state image sensor is arranged so as to vibrate or swing in a plane orthogonal to an incoming image light, horizontally, periodically and relative to the image light in a given vibration mode. When the sensor is applied for an NTSC television system in which one form is comprised of two fields, the image sensor swings so that it senses an image at different sampling positions during the one field period. As a result, a reproduced picture has an enhanced resolution, which is obtained as if the picture element members of the image sensor per se were doubled.

An image signal obtained by such a swing-type solid-state image sensor normally includes a reset noise component (e.g., approx. 500 mV) and a DC offset component (e.g., approx. 5 V to 10 V). Therefore, it is necessary to reproduce an image of preferable quality that the output signal from the solid-state image sensor is processed in such a manner that the noise components are removed without causing the waveform deterioration of the rectangular image signal components. An arrangement for preferably removing the noise components is by using a linear detection circuit. However, the production of this circuit is commercially difficult. In order to process a signal without deteriorating the image signal component in a case where the frequency $f_{cp}$ of a clock pulse of the solid-state image sensor is 7.16 MHz, it is necessary to pass tertiary high frequency components contained in the signal; the result being that the frequency band of the linear detection circuit requires at least 20 MHz or more. In the detection circuit having a wide frequency band, the deterioration of the signal phase characteristics cannot be avoided. As a result, a problem arises such that an amplitude distortion is generated between the image signals occurring in both fields, thereby producing a flicker.

SUMMARY OF THE INVENTION

It is an object of the present invention to provide a new and improved image signal reproduction circuit, which is adapted for a solid-state image sensing system of a swing-type image sensing system and which can reproduce an output image from the image sensing system while maintaining high resolution and high image quality.

An image signal reproduction circuit of the present invention is applied to a swing-type image sensing system which is constructed to produce a plurality of field image signals in such a manner that a solid-state image sensor senses an image while periodically swinging, relative to an incoming light in synchronization with one frame period and displacing to different sampling positions in a plurality of field periods contained in one frame period. According to the image signal reproduction device, a carrier generator selectively generates first and second carrier signals which have the same frequency as the horizontal readout frequency of the solid-state image sensor, and which also have peak points coincident to the first and second sampling positions of the solid-state image sensor during the first and second field period contained in one frame period. An amplitude modulation circuit amplitude-modulates the first and second carrier signals in response to the first and second field image signals supplied from the swinging solid-state image sensor. After a signal processing unit slices the first and second amplitude-modulated field image signal at a suitable signal level, the unit produces field image signals of the first and second pulse-like shaped waveforms. The first and second pulse-like shaped field image signals are synthesized with each other to obtain an amplitude modulation frame image signal. The amplitude modulation frame image signal has peak points coincident to the above-described first and second field sampling positions of the solid-state image sensor.

BRIEF DESCRIPTION OF THE DRAWINGS

The present invention is best understood with reference to the accompanying drawings, in which:

FIGS. 6A to 6I are signal waveform diagrams for describing the manner in which amplitude of field image signal is modulated by the image signal reproduction device provided in the image sensing system in FIG. 1;

FIGS. 7A to 7C are model drawings of the state in which the swing-type solid-state image sensor in FIG. 2 senses an image, while periodically displacing the different sampling positions in two field periods of one frame period, and eventually obtains a frame image;

FIG. 8 a block diagram schematically illustrating entire configuration of an image sensing system containing a single-plate color CCD image sensor, to which an image signal reproduction device of a second embodiment of the present invention is applied; and FIG. 9 is a block diagram schematically illustrating the entire configuration of an image sensing system of the type in which the image signal reproduction device of the second embodiment of the present invention is applied to an electronic still camera.

DETAILED DESCRIPTION OF THE PREFERRED EMBODIMENTS

Figure 1:
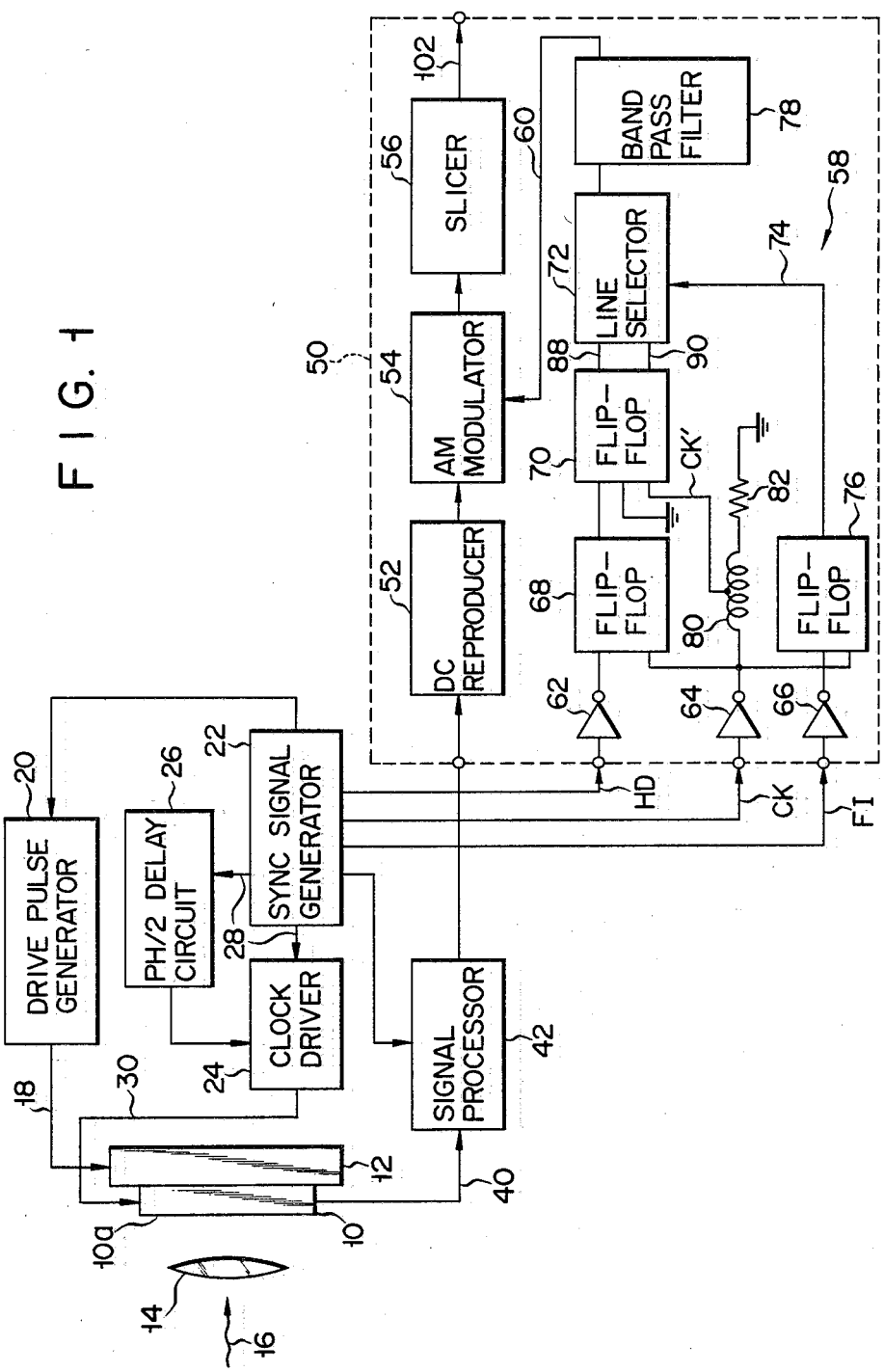
FIG. 1 is a block diagram schematically showing the entire configuration of an image sensing system, to which an image signal reproduction device of an embodiment of the present invention is applied.

Referring now to FIG. 1, there is schematically illustrated the entire configuration of an image sensing system constructed in such a manner that a solid-state image sensor itself swings in a predetermined vibration mode to an incoming image light, according to a preferred embodiment of the present invention. In FIG. 1, an interline-transfer-type charge-coupled device (abbreviated and referred as to "an IT-CCD" hereinafter) 10 is employed as an area image sensor. The IT-CCD 10 is secured to a vibration stand 12 on the back surface thereof opposite to an image sensing region 10a, which faces a lens 14 to which an optical image 16 is introduced. This stand 12 periodically vibrates relative to an incoming light 16 in response to a swing drive signal 18 from a drive pulse generating circuit 20. Thus, the IT-CCD secured to the stand 12 vibrates or swings in a similar vibration mode. In this embodiment, the IT-CCD 10 is driven, for example, to horizontally vibrate the CCD during one frame period of an image sensing operation: a period in accordance with NTSC standard television system in which one frame consists of two fields. Therefore, the IT-CCDs 10 are disposed at the different sampling positions in the A and B field periods of one frame. The vibrating amplitude of the CCD at this time is set to one half of the pitch PH of a picture element. In other words, the spatial sampling region in the horizontal direction of the IT-CCD 10 in one frame period effectively becomes two positions.

In order to achieve the vibration image sensing operation of the aforementioned CCD 10, there are provided a sync signal generator 22, a clock driver 24 and a PH/2 delay circuit 26. The sync signal generator 22 is connected to the clock driver 24 and the delay circuit 26. The sync signal generator 22 generates a sync pulse signal (or timing signal) 28, which contains pulses necessary to drive the IT-CCD 10 and pulses necessary for signal processing, in accordance with the NTSC system. The delay circuit 26 serves to delay the clock pulses of a horizontal readout register (not shown) of the IT-CCD 10, corresponding to one half of the horizontal picture element pitch PH of the CCD. In other words, the PH/2 delay circuit 26 serves to delay by PH/2 the horizontal readout timing of the IT-CCD 10 in the B field of the A and B fields contained in one frame, according to the NTSC system. The clock driver 24 supplies a clock signal 30 suitable for the IT-CCD 10.

Figure 2:
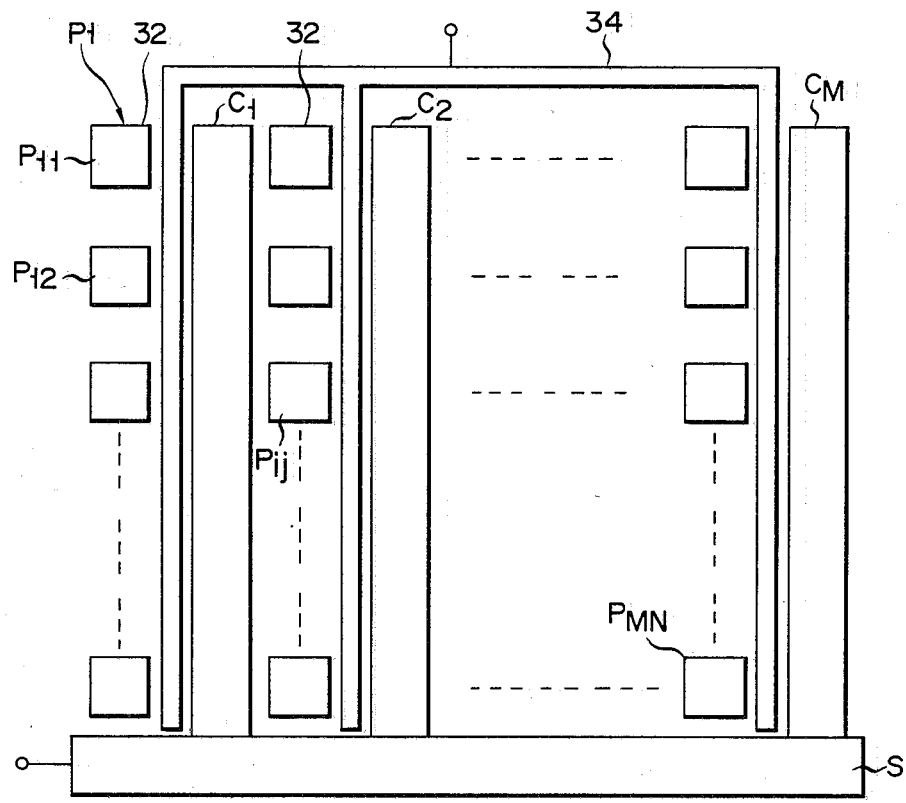
FIG. 2 is a structural view showing the plane configuration of the image sensing region of a swing-type solid-state image sensor contained in the image sensing system in FIG. 1.

As shown in FIG. 2, the IT-CCD 10 has a photosensitive section 32 consisting of photosensitive elements or photodiodes $P_{11}$, $P_{12}$, ..., $P_{ij}$, ..., $P_{MN}$ of N by M (N=500 and M=400, for example). The photodiodes P are arranged in a matrix form on a CCD substrate (not shown). M units of vertical CCDs $C_1$, ..., $C_M$ are arranged adjacent and opposite to M lines of photodiodes $P_1$, ..., $P_M$. The vertical CCDs $C_1$, ..., $C_M$ are connected to a horizontal CCD shift register S at the final transferring stages thereof. A field shift gate or FSG 34 is formed to have gate portions each extending between the vertical photodiode lines $P_1$, ..., $P_M$ and the vertical CCDs $C_1$, ..., $C_M$. When pulse voltage signal (or gate control signal) is supplied to the FSG 34, signal charges stored in the photodiodes P due to the incident light radiation are transferred to the vertical CCDs C. The charges transferred to the CCDs C are further transferred successively to the CCD shift register S.

Figure 3:
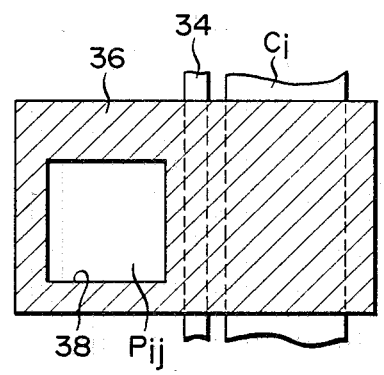
FIG. 3 is a plan view showing in detail the partial structure of a region corresponding to one picture element in the image sensing region in FIG. 2.

FIG. 3 is a partial plan view showing an enlarged image sensing region corresponding to a picture element or one cell of the photosensitive sections 32 of the IT-CCD 10 in FIG. 2. In FIG. 3, the portion 36, shown by a shaded part for convenience in FIG. 3, denotes an aluminum electrode (Al electrode) for shielding incoming light. This Al electrode 36 has an opening 38, under which a photodiode $P_{ij}$ corresponding to a signal image sensing cell is disposed. A vertical CCD $C_i$ and the FSG 34 run under the Al electrode 36 and are accordingly shielded by the Al electrode 36 which serves as a nonsensitive region. The Al electrode 36 carries out optical separation between the adjacent photodiodes.

Figure 4A:
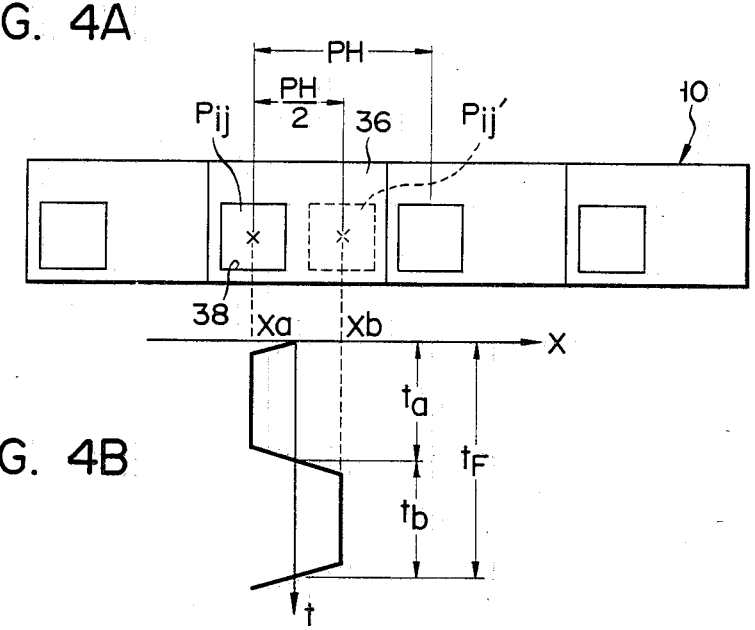
FIG. 4A is a plan view of part of a plurality of picture element regions for explaining the swing-type image sensing mode of the swing-type solid-state image sensor in FIG. 2.
Figure 4B:
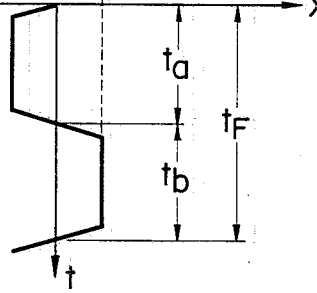
FIG. 4B is a graph showing the vibration waveform of the solid-state image sensor correspondingly to the picture element region in FIG. 4A.

In order to describe the swing image sensing mode of the IT-CCD 10 as briefly described above, a plurality of cell image sensing regions of the CCD, in which the single image sensing cells shown in FIG. 3 are arranged horizontally, is illustrated again in a model. The IT-CCD 10 is driven to be swung relative to the incoming light 16 in such a manner that the openings 38 of the respective cells of the IT-CCD 10 are alternatively disposed at two different sampling positions of the horizontal direction (X-axis direction) in one frame period $t_F$ consisting of two A and B field periods $t_a$ and $t_b$. FIG. 4B is a graph illustrating the vibrating waveform of how the position of one cell $P_{ij}$ of the IT-CCD 10 varies as plotted on a time lapse in one frame period $t_F$. As apparent from FIG. 4B, the cell $P_{ij}$ is displaced to be respectively disposed at two positions Xa, Xb of X-axis direction (the distance of them is equal to PH/2) in the two field periods $t_a$, $t_b$. Thus, the spatial sampling region in horizontal direction of one frame period $t_F$ of the IT-CCD 10 becomes two positions.

Returning again to FIG. 1, an output image signal 40 from the swing image sensing IT-CCD 10, as described above, is supplied to an ordinarily constructed signal processing circuit 42 in which a reset noise contained in the output signal 40 is removed. The output image signal is then processed for blanking, white clipping, gamma-correcting and the like. After completion of the signal processing, the output image signal 40 has a waveform horizontally averaging the CCD. The image signal output from the signal processor 42 is supplied to an image signal reproduction device 50 of the present invention.

Figure 5A:
FIGS. 5A to 5G are views showing the waveforms of signals generated from the essential sections of the image sensing system in FIG. 1.
Figure 5B:

The image signal reproduction device 50 includes a clamp circuit or a DC reproducer 52 for converting an input image signal into a signal containing a DC component, an AM modulator 54 for amplitude-modulating the output signal of the reproducer 52, and a slicer 56 for slicing the output signal from the modulator 54 at a predetermined level. A carrier signal generator 58 is provided to supply a carrier signal 60 to the AM modulator 54. The generator 58 included in the image signal reproduction device 50 receives from the sync signal generator 22 a horizontal sync pulse signal HD, a clock pulse signal CK having twice the frequency value (e.g., 7.16 MHz) of the clock pulse signal of the horizontal readout register, and a field pulse signal FI. The horizontal sync pulse signal HD has a pulse waveform shown in FIG. 5A, and its one period is set, for example, to 63.56 μsec. The clock pulse signal CK is shown in FIG. 5B and has a frequency of 14.32 MHz. The field pulse signal FI has a low frequency level in the A field period $t_a$ and a high frequency level in the B field period $t_b$. These signals are input to three input buffers 62, 64 and 66.

In the image signal reproduction device 50, the input buffer 62 is connected through a D type flip-flop 68 and a JK type flip-flop 70 to a 2-input line selector 72, which performs the line selecting operation (line switching) in response to the output pulse signal 74 from the D type flip-flop 76. The output terminal of the line selector 72 is connected through a band-pass filter 78 to the above-described AM modulator 54. It should be noted that the output terminal of the input buffer 64 is connected directly to the clock inputs of the two D flip-flops 68, 76, and connected through a delay unit 80, consisting of an inductive coil, to the clock input of the JK flip-flop 70. The delay unit 80 has one end grounded through a resistor 82.

Figure 6G:
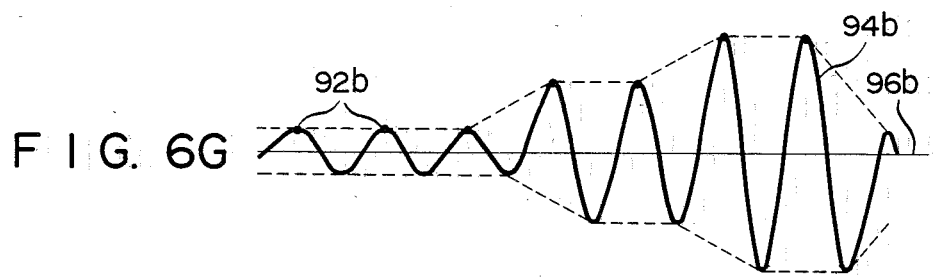
Figure 6H:
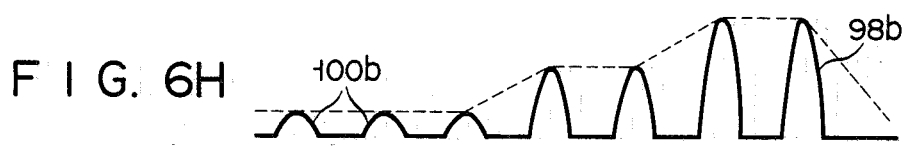
Figure 6I:
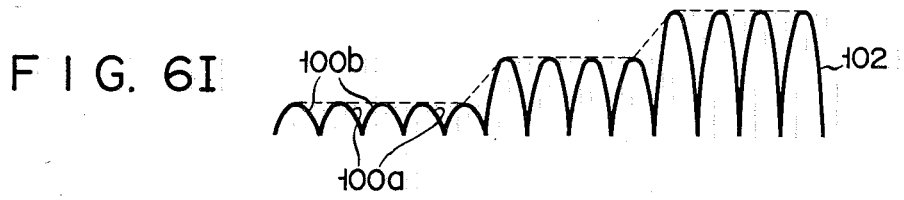

The operation mode of the image signal reproduction device thus constructed will be described in detail with reference to FIGS. 6A to 6I. When a to-be-sensed object varying in the quantity of light (brightness) stepwise from the left side to the right side of one image sensing screen, as shown in FIG. 6A, is picked up by the swing IT-CCD 10, the spatial sampling points of the A and B fields are illustrated by reference numerals 86a and 86b on the stepwise image signal level of FIGS. 6A and 6E. These A field sampling points 86a and B field sampling points 86b are displaced by one half of the horizontal picture element pitch PH of the IT-CCD 10 with the starting point of the horizontal image signal as a reference. The horizontal resolution of the reproduced image can be improved by approximately twice the resolution that can be expected from the actual (natural) number of picture elements of the IT-CCD 10 by adding the field output signals having a rectangular waveform corresponding to the sampling points 86 on the reproduced image. However, since the pulse-like waveform CCD image signal is averaged to become a continuous signal waveform by the signal process of the ordinarily constructed signal processor 42, shown in FIG. 1, high resolution of the reproduced image cannot immediately be expected even if the A and B field image signals are added. This problem is solved by the newly added reproduction device 50, according to the present invention.

Figure 5C:
Figure 5D:
Figure 5E:
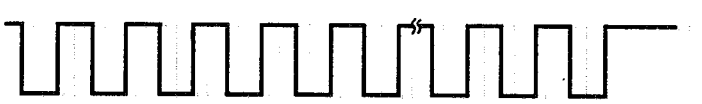
Figure 5F:
Figure 5G:
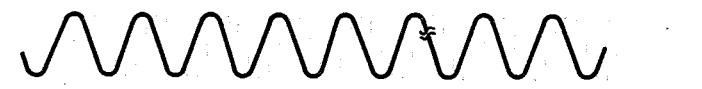

The A and B field image signals of an averaged waveform are remade into an image signal, which includes a DC component, by the DC reproducer 52 of the signal reproduction device 50 in the signal processor 42 and supplied to the AM modulator 54. The waveforms of the A and B field image signals are respectively shown in FIGS. 6B and 6F. Simultaneously, the horizontal sync pulse signal HD, clock pulse signal CK and field pulse signal FI supplied to the carrier signal generator 58 are respectively waveform-shaped by the input buffers 62, 64 and 66. The pulse signal HD is matched in phase by the D flip-flop 68 in synchronization with the clock pulse signal CK, and then supplied to the J input of the JK flip-flop 70 of the rear stage. (The K input of the JK flip-flop 70 is grounded.) Simultaneously, to the clock input of the JK flip-flop 70 is supplied a clock pulse CK'; the phase of which is displaced by the delay time $t_d$ in such a manner that the clock pulse signal CK matches the actual spatial sampling point by a phase adjuster consisting of the delay unit 80, as shown in FIG. 5C. Thus, pulse signals 88, 90, which have a period of 140 nsec substantially corresponding to a horizontal readout frequency of 7.16 MHz and have phases in reverse to each other (the phases are displaced by 180°) as shown in FIG. 5D and FIG. 5E, are presented at two output terminals Q, $\overline{Q}$ of the JK flip-flop 70.

These pulse signals 88, 90 are supplied to the line selector 72 of next stage. Since the output signal 74 (produced by the D flip-flop 76 phase adjusting the field pulse signal FI to synchronize with the clock pulse signal CK) is supplied to the select input of the line selector 72, the line selector 72 selectively outputs one of the pulsate carrier signals having the same frequency as the horizontal readout frequency and outputs reverse phases displaced at 180° from each other in response to the signal 74. In other words, an A field carrier signal and a B field carrier signal having a reverse phase displaced by 180° from the phase of the A field carrier signal are alternatively output by the line selector 72 in the A and B field periods. Harmonic components existing in the field carrier signal are removed by a band-pass filter 78 from the field carrier signal. Thus, a carrier signal 60 of a sinusoidal waveform, in which the phases are displaced by 180° from one other between the A field and the B field, is applied to the AM modulator 54.

The amplitude of the sinusoidal carrier signal 60 is modulated in response to the image signal from the DC reproducer 52 containing the above-described DC component. Thus, the AM modulation signal shown in FIGS. 6C and 6G is produced in the A and B fields. It should be noted that the spatial sampling points 86a in the A field is accurately coincident to the peak point 92a of the AM-modulated A field carrier signal 94a, and that the spatial sampling point 86b in the B field is accurately coincident to the peak point 92b of the modulated B field carrier signal 94b. Therefore, the amplitude of the averaged output image signal is modulated so as to be coincident to the actual spatial sampling point of the swing image sensing IT-CCD 10.

The AM-modulated signals 94a, 94b of the A and B fields thus obtained are supplied to the slicer 56. The slicer 56 removes or slices the signal component having a signal level equal to or lower than the suitable signal level 96 of the modulated wave 94, thereby generating a single-sideband modulated AM signal (single-polarity AM signal) 98a, 98b, respectively shown in FIGS. 6D and 6H. The peak points of projection signal components 100a, 100b respectively contained in these signals are displaced from each other by PH/2. These sliced signals 98a, 98b of the A and B fields are added to each other (field addition), thereby producing a one-frame AM modulation signal 102 illustrated in FIG. 6I; in which the signal projections 100a, 100b of the A and B fields are different from each other and densely arranged. When the reproduced image is displayed on a CRT screen (not shown) on the basis of the frame AM signal, twice the resolution, previously mention, of the resolution to be led from the actual number of picture elements of the IT-CCD 10 is performed on the reproduced image; since the A and B field image signals from the IT-CCD 10, where the sampling positions are displaced by one half of the picture element pitch PH between the A and B fields, are remade by the reproduction device 50 to AM modulation image signals having a peak signal component 100 accurately displaced from each other by PH/2 in synchronization with the sampling point. FIG. 7 is a view illustrating the spatial sampling point and the sampling point on the reproduced image for concretely describing the above-described operation. The spatial sampling points of the input optical image of the A field in the solid-state image sensors, arranged in a two-dimensional manner, become the positions shown by 110 in FIG. 7A. The signal charge reading operation at this time is in the order of n, n+1, . . . In the B field, they become the positions vibrated horizontally by one half of the horizontal picture element pitch PH, i.e., the positions shown by 112 in FIG. 7B. The signal charge reading operation at this time is in the order of (n)', (n+1)', . . . displaced by one pitch in the vertical picture element direction to the A field. Thus, the vertical interlace image sensing operation is carried out, thereby improving the vertical resolution. The A and B field spatial sampling points are doubled horizontally to the CCD as apparent from FIG. 7. Even when the signal is averaged through the ordinary signal processor 42, the reproduced image shown in FIG. 7C can be obtained by way of the image signal reproduction device 50 of this embodiment. In the A field, signals are displayed at the positions 114 corresponding to the spatial sampling points of n, n+1 and n+2 as illustrated in a model in FIG. 7C, while in the B field, signals are displayed at the positions 116 corresponding to the spatial sampling points of (n)', (n+1)'. In this manner, the horizontal resolution can be twice improved.

Further, according to the image signal reproduction device 50 of the present invention, the reproduced image of high quality, including less noise components, can be obtained without a conventional linear detector having the wide band characteristic of 20 MHz or more required for processing an image signal. The simplicity of the circuit configuration required for reproducing the image signal also contributes to the improvement in product reliability. Further, when the image signal reproduction device 50 of the present invention is provided in an image display unit, isolated from the image sensing device which includes the swing image sensing CCD 10 such as a CRT display (not shown) side, in order to display the image sensing screen of doubled resolution on the CRT, the necessary frequency band characteristics of a cable for electrically connecting the image sensing device and the reproduction device 50 attached to the CRT display can be moderated. In addition, when the image signal reproduction device 50 of the present invention is employed, the production of a moire in the reproduced image can be suppressed since the respective field AM modulation signals of reverse phases are produced, thereby allowing the moires of the CCDs to come into a reverse phase relationship to increase the opportunity of canceling each other.

FIG. 8 illustrates an image signal reproduction device applied for an electronic color camera including a single-plate color CCD image sensor (not shown) in accordance with a second embodiment of this invention. The color CCD image sensor is constructed in principle to carry out the swing image sensing operation similarly to the above-described first embodiment. A collar multiplex image signal 122 fed from the image sensor is divided by a color separator 124 into fundamental three primary color signals, i.e., red (R) signal 126r, green (G) signal 126g, and blue (B) signal 126b. The color separator 124 separates the color by employing band-pass filters and low-pass filters (not shown), for example, in accordance with the known frequency separation system. (In case of a phase separation system, the color separator 124 separates the color by employing sample/hold circuits.) The R, G and B signals 126 from the color separator 124 are not rectangular signals responsive to the spatial sampling positions of the swing image sensing CCD varying between the fields, but an image signal of continuous waveform averaged and smoothed horizontal to the CCD. Accordingly, even if the R, G and B signals 126 are processed by corresponding signal processors 128, 130 and 132 in which necessary signal processes such as gamma correction, white clipping and the like are carried out, high resolution characteristics originally expected cannot be obtained from the swing image sensing CCD type camera.

The R, G and B signals output from the signal processors 128, 130 and 132 are supplied to an image signal reproduction device 120. In the device 120, there are provided 3 sets of DC reproducers 134r, 134g and 134b, AM modulators 136r, 136g and 136b, and slicers 138r, 138g and 138b exclusively for the three R, G and B signals. The respective components have functions and configurations similar to the corresponding components of the above-described first embodiment. Since the carrier generator provided in the device 120 is constructed entirely similarly to that of the above-described embodiment of FIG. 1, similar reference numerals are attached to that in FIG. 8. It should be noted that the internal configuration of the carrier generator is summarized and drawn to three component blocks 140, 142 and 144 for the purpose of simplification. The three function blocks are a phase adjuster 140, a phase shifting circuit 142, and a field switching circuit 144. The carrier signal 60 output from the carrier generator 58 is simultaneously supplied to the three AM modulators 136r, 136g and 136b.

The signals 126 separated into R, G and B color components are respectively processed through the DC reproducers 134r, 134g and 134b to signals including DC components. Subsequently, the signals are each supplied to AM modulators 136r, 136g and 136b, which respectively AM-modulate the carrier signals 60 phase-controlled to match the spatial sampling points obtained from the carrier signal generator 58. Then, the slicers 138r, 138g and 138b respectively produce signals sliced at a predetermined level or lower. The R output 140r, G output 140g and B output 140b thus obtained are, for example, applied to the input terminals of R, G and B monitors, respectively. Thus, a color image having less moire with high resolution can be obtained on the reproduced image.

FIG. 9 schematically illustrates an image sensing system, wherein the signal reproduction device 120 of the present invention is applied to an electronic camera which employ no ordinary photosensitive film. The resolution required for the electronic camera is horizontally 1,000 picture elements or more. In the present solid-state image sensor fabrication technique, it is difficult to satisfy this number of picture elements. The features of the present invention can be maximally utilized by applying the present invention to an electronic still camera 150 requiring particularly high resolution.

The input light to the electronic camera body 150 is focused through a lens 152 and a shutter 154 on a swing image sensing type CCD chip 156. The CCD chip 156 is secured onto a vibration stand 158. To the stand 158 and the solid-state image sensing type CCD chip 156 are applied a vibration pulse obtained from a drive circuit 160 and a pulse necessary to drive the solid-state image sensor in the same manner as the above-described first embodiment. When the amplitude of the vibration pulse is set to one half of the horizontal picture element pitch in synchronization with the field period, the output signal obtained form the solid-state image sensing type CCD chip 156 is doubled to that of the conventional solid-state image sensor horizontal to the spatial sampling point. The signals are then processed into waveforms in the signal processor 162 for color separation, gamma correction, and decision of level necessary to be recorded in a modulator 164. The signals are then recorded in the input image, for example, on a magnetic disc 168 through signal record/reproduction circuit 166.

When reproduction of the recorded image is desired, the image signal 170 is read out via the signal record/reproduction circuit 166, and separated by a demodulator 172 into red (R) signal 174r, green (G) signal 174g and blue (B) signal 174b of primary color signals. Then, the carriers of the phase matched to the actual spatial sampling points are AM-modulated by employing an image signal reproduction unit 120 in the same manner as described with reference to FIG. 8, and an image signal thereafter sliced at a predetermined level or lower is obtained. This image signal is averaged once by the signal processor 162, and a sampling point of a signal with low resolution is reproduced. When the signal is then input, for example, to the R, G and B color monitors 176, the color image of high resolution may be reproduced on a hard copy 178. Further, the color image of high resolution may be written in a memory 180 such as a ROM. In this case, it is necessary to digitize the analog signal via an A/D converter. In this digitization, the timing can be readily taken by employing the output signal reproduced at the sampling point, thereby enabling effective A/D conversion.

Although the present invention has been shown and described with respect to particular embodiments, various changes and modifications which are obvious to a person skilled in the art to which the invention pertains are deemed to lie within the spirit and scope of the invention. For example, in the second embodiment, the color signal process of RGB type has been employed. However, similar advantages of the present invention can also be expected even in YRGB type and YRB type color signal processes. In these cases, only Y signal may be applied to the signal reproducer of the present invention. Further, the present invention may also be applied not only to the signal process of a frequency interleave type color filter, but of other color filter such as a phase separation type.

In the embodiments described above, the carrier phase of the AM modulator has been controlled to be just coincident to the spatial sampling point of the solid-state image sensor at the peak point of one period. However, even if the phase is slightly displaced, the deterioration in the resolution is small amount and does not disturb the image sensor. Further, similar high resolution can be expected by applying the present invention to a signal process such as an interline-transfer-type CCD, a frame transfer type CCD, 2-stair-built sensors using as photoelectric conversion photoconductive films, and a sensor in which photosensitive units are disposed in zigzag state. Moreover, in the embodiments described above, the solid-state image sensor in which a horizontal picture element vibration has been carried out has been shown and described, but the resolution can be expected to be improved by applying the present invention to a case where the vibration is obliquely carried out.

The present invention may also be applied to the sensor in which an electronic beam image is coming into the CCD photosensitive units in synchronization with the fields by vibrating in an arbitrary direction. In summary, the present invention may be applied to the solid-state image sensor which is vibrated in an arbitrary direction relative to the incoming optical image in synchronization with the respective fields. Further, the present invention may be utilized for not only a video camera adapted for a standard television system, an electronic camera, but other apparatuses having means for sensing an incoming optical image, such as an OCR, a facsimile, a copy, and similar advantages may be obtained.

What is claimed is:

1. An image signal reproduction device utilized for a specific image sensing system in which a solid-state image sensor swings periodically and relative to an incoming light in synchronization with one frame period to sense the light while displacing to different sampling positions in a plurality of field periods included in one frame period, thereby generating a plurality of field image signals, said image signal reproduction device comprising:
    (a) carrier generator means for producing first and second carrier signals having the same frequency as the horizontal readout frequency of said solid-state image sensor and waveforms having peaks respectively coincident to first and second sampling positions of said solid-state image sensor in first and second field periods included in one frame period;
    (b) modulator means, connected to said solid-state image sensor and said carrier generator means, for amplitude-modulating the first and second carrier signals in response to the first and second field image signals supplied from said solid-state image sensor to output the first and second amplitude-modulated field image signals;
    (c) first signal processing means, connected to said modulator means, for slicing the first and second amplitude-modulated field image signals at a suitable signal level to produce the first and second field image signals having pulse-like shaped waveforms; and
    (d) second signal processing means, connected to said first signal processing means, for synthesizing said first and second field image signals to produce an amplitude-modulated frame image signal, which has a waveform having peaks coincident to the first and second sampling positions of said solid-state image sensor, said peaks contributing directly to the resolution of the reproduced image.

2. The device according to claim 1, wherein said carrier generator means comprises:
    first circuit means for receiving a clock pulse signal used for driving said solid-state image sensor, and for inverting the clock pulse signal to produce first and second pulse signals shifted in phase at substantially 180° from each other; and
    second circuit means, connected to first said circuit means, for receiving the first and second pulse signals and for selectively producing a pulse signal of said first and second pulse signals in synchronization with the first and second field periods included in one frame period of said solid-state image sensor.

3. The device according to claim 2, wherein said carrier generator means further comprises:
    third circuit means, connected to said second circuit means, for waveform-shaping the output pulse signal from said second circuit means to produce a carrier signal of substantially sinusoidal waveform.

4. The device according to claim 2, wherein said solid-state image sensor swings periodically and relative to an incoming light with a vibration amplitude of substantially one half of the horizontal picture element pitch of said solid-state image sensor to an incoming light in synchronization with one frame period; and wherein the carrier signal phases of said first and second sinusoidal waveforms are displaced at substantially 180° from each other.

5. The device according to claim 4, wherein said solid-state image sensor includes an interline-transfer-type charge coupled device.

6. An image sensing system comprising:
(a) solid-state image sensor means for sensing an incoming image light having a predetermined number of horizontal picture elements;
(b) swing drive means, mounted on said image sensor means, for swinging said image sensor means periodically relative to the incoming light in synchronization with one frame period to pick up the light while displacing said image sensor means to different sampling positions in a plurality of field periods;
(c) first signal processor means, connected to said image sensor means, for receiving the first and second field image signals supplied from said image sensor means and for processing the signals so as to produce continuous third and fourth field image signals having an averaged signal level;
(d) carrier generator means for producing first and second carrier signals having a phase in reverse to one another in the first and second field periods;
(e) modulator means, connected to said first signal processor means and said carrier generator means, for amplitude-modulating said first and second carrier signals by employing said third and fourth field image signals to output first and second amplitude-modulated field image signals, said first and second amplitude-modulated field image signals having discrete waveforms of pulse-like shape including peak points respectively coincident to the first and second sampling positions of said image sensor means; and
(f) second signal processor means, connected to said modulator means, for synthesizing said first and second amplitude-modulated field image signals to produce an amplitude-modulated frame image signal representing the reproduced image having substantially double the number of horizontal picture elements of said image sensor means.

7. The system according to claim 6, wherein said carrier generator means produces first and second carrier signals having the same frequency as the horizontal readout frequency of said image sensor means and peak points respectively coincident to the first and second sampling positions of said image sensor means in the first and second field periods included in one frame period.

8. The system according to claim 7, wherein said swing drive means vibrates said image sensor means in the vibration amplitude corresponding to substantially one half of the horizontal picture element pitch of said image sensor means.

9. The system according to claim 8, wherein said carrier generator means includes:
first flip-flop circuit means for receiving a clock pulse signal and horizontal sync pulse signal used for driving said image sensor means, and for phase-adjusting the phase of said horizontal sync pulse signal to coincide with the phase of said clock pulse signal;
phase delay circuit means for receiving the clock pulse signal used for driving said image sensor means, and for delaying the phase of the clock pulse signal to shift substantially 180 degrees and
second flip-flop circuit means, connected to said first flip-flop circuit means and phase delay circuit means, for receiving the output signals from said flip-flop circuit means and said phase delay circuit means and for producing first and second pulse signals displaced in phase at substantially 180° from each other.

10. The system according to claim 9, wherein said carrier generator means further includes:
line selector means connected to said second flip-flop circuit means, for receiving first and second pulse signals and for selectively outputting said first and second pulse signals in synchronization with said first and second field periods of said image sensor means.

11. The system according to claim 10, wherein said carrier generator means further comprises:
band-pass filter means, connected to said line selector means, for waveform-shaping a output pulse signal from said line selector means to produce a sinusoidal waveform carrier signal.

12. The system according to claim 11, wherein said carrier generator means further comprises:
third flip-flop circuit means, connected to said line selector means, for receiving a clock pulse signal and field pulse signal used for driving said image sensor means, and for phase-adjusting the phase of said field pulse signal to coincide with the phase of said clock pulse signal to supply said line selector means with a command signal which controls the signal selection of said line selector means.

* * * * *